(12) United States Patent
Ozugur

(10) Patent No.: US 8,285,784 B2
(45) Date of Patent: Oct. 9, 2012

(54) SERVICE CREATION VIA PRESENCE MESSAGING

(75) Inventor: Timucin Ozugur, Fairview, TX (US)

(73) Assignee: Alcatel Lucent, Paris (FR)

( * ) Notice: Subject to any disclaimer, the term of this patent is extended or adjusted under 35 U.S.C. 154(b) by 942 days.

(21) Appl. No.: 11/268,859

(22) Filed: Nov. 8, 2005

(65) Prior Publication Data

US 2007/0116196 A1    May 24, 2007

(51) Int. Cl.
G06F 15/16   (2006.01)
G06F 3/00    (2006.01)

(52) U.S. Cl. ........................ 709/204; 719/317

(58) Field of Classification Search ............... 379/67.1, 379/230; 709/206, 204; 719/317; 705/26
See application file for complete search history.

(56) References Cited

U.S. PATENT DOCUMENTS

| | | | | |
|---|---|---|---|---|
| 5,742,763 A * | 4/1998 | Jones | | 719/317 |
| 5,903,877 A * | 5/1999 | Berkowitz et al. | | 705/7.15 |
| 5,915,008 A * | 6/1999 | Dulman | | 379/221.08 |
| 5,995,939 A * | 11/1999 | Berman et al. | | 705/3 |
| 6,430,602 B1 * | 8/2002 | Kay et al. | | 709/206 |
| 6,865,260 B1 * | 3/2005 | Meadows et al. | | 379/88.22 |
| 6,957,257 B1 * | 10/2005 | Buffalo et al. | | 709/224 |
| 7,146,404 B2 * | 12/2006 | Kay et al. | | 709/206 |
| 7,249,171 B2 * | 7/2007 | Goto | | 709/223 |
| 7,603,411 B1 * | 10/2009 | Davies et al. | | 709/204 |
| 2002/0103917 A1 * | 8/2002 | Kay et al. | | 709/229 |
| 2003/0009385 A1 * | 1/2003 | Tucciarone et al. | | 705/26 |
| 2004/0064557 A1 * | 4/2004 | Karnik et al. | | 709/225 |
| 2006/0031365 A1 * | 2/2006 | Kay et al. | | 709/206 |
| 2007/0124469 A1 * | 5/2007 | Mohammed et al. | | 709/225 |

OTHER PUBLICATIONS

Campbell, et al.; SIMPLE Presence Publication Mechanism; IETF SIMPLE Internet Draft; Oct. 24, 2002; pp. 1-25; draft-olson-simple-publish-01.
Day, M., et al.; A Model for Presence for Instant Messaging; IETF Network Working Group; RFC 2778; Feb. 2000; pp. 1-17.
Universal Mobile Telecommunications System (UMTS); ETSI Standards; European Telecommunications Standards institute; Sophia-Antipo, FR; vol. 3-SA1, No. V520; Mar. 2002.

* cited by examiner

*Primary Examiner* — Firmin Backer
*Assistant Examiner* — Michael A Chambers
(74) *Attorney, Agent, or Firm* — RG & Associates

(57) ABSTRACT

A system, method and computer readable medium for service creation via presence messaging comprising assigning an information exchange state associated with a presence message and directing the presence message to at least one of a service provider from a predetermined set of service providers.

12 Claims, 3 Drawing Sheets

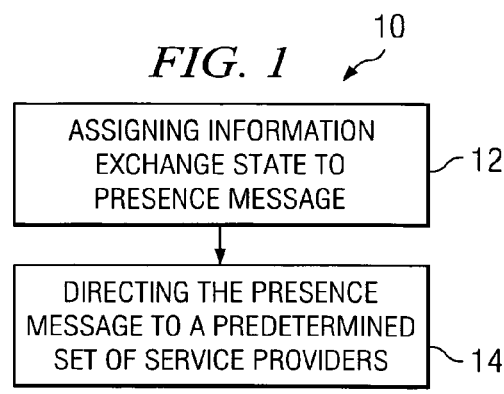
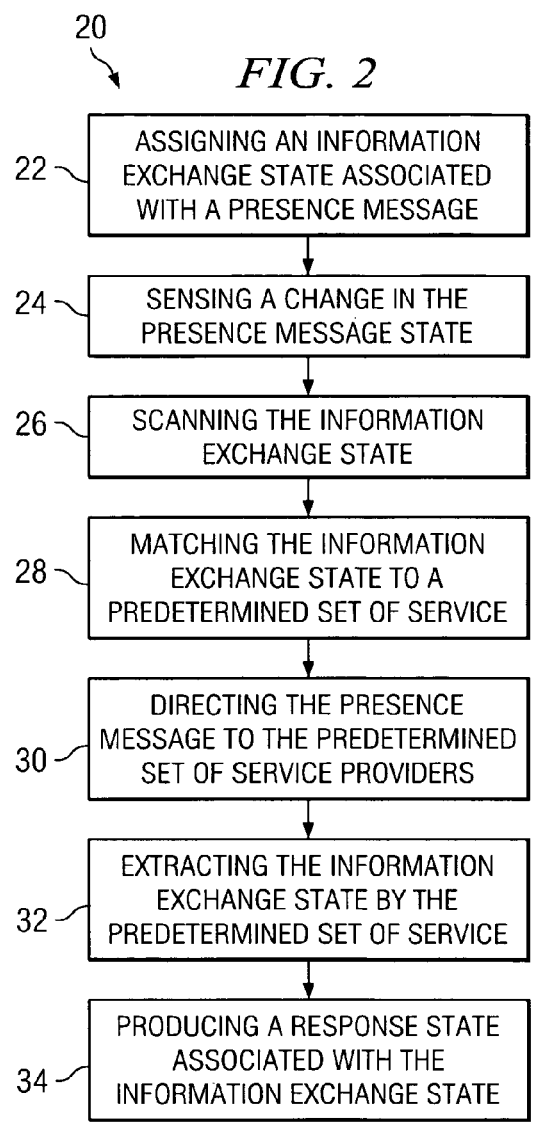
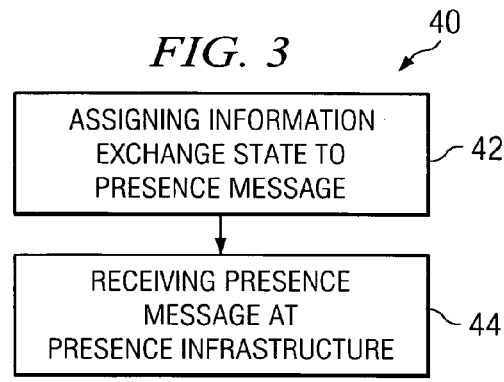
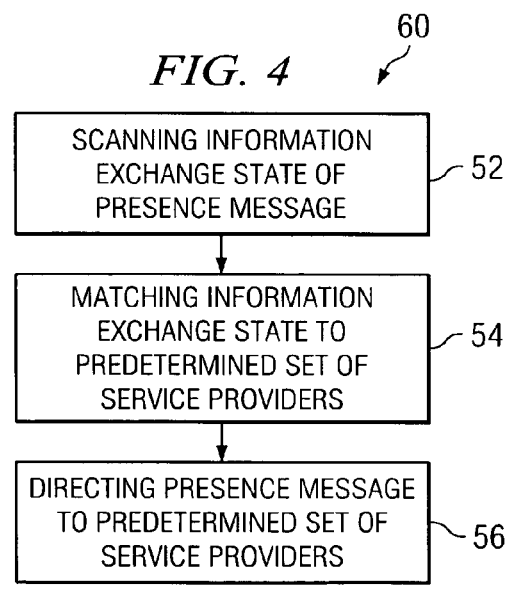

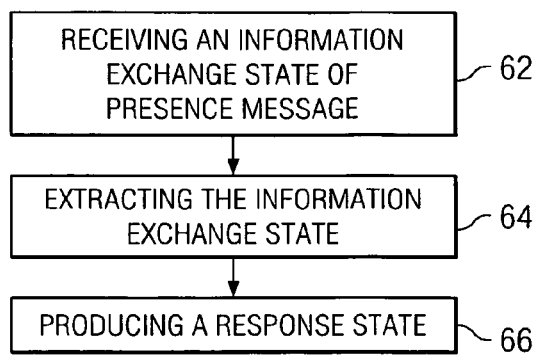
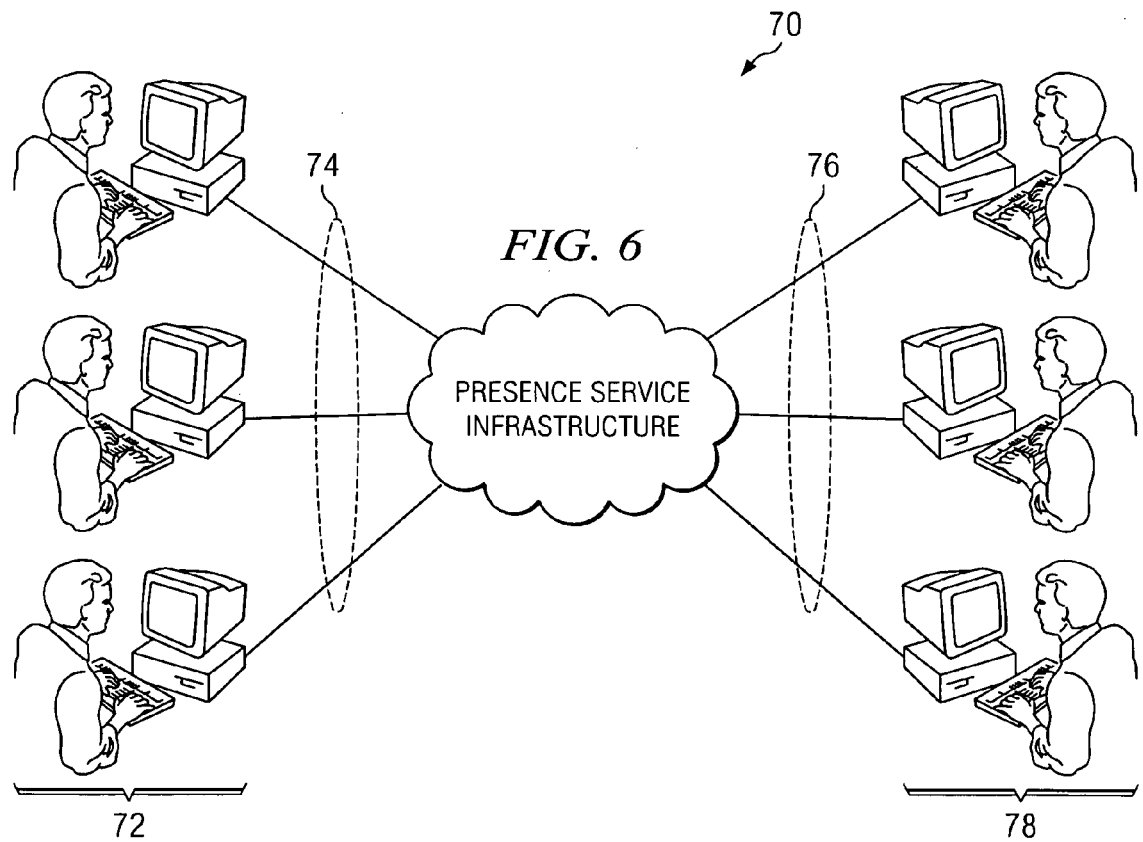

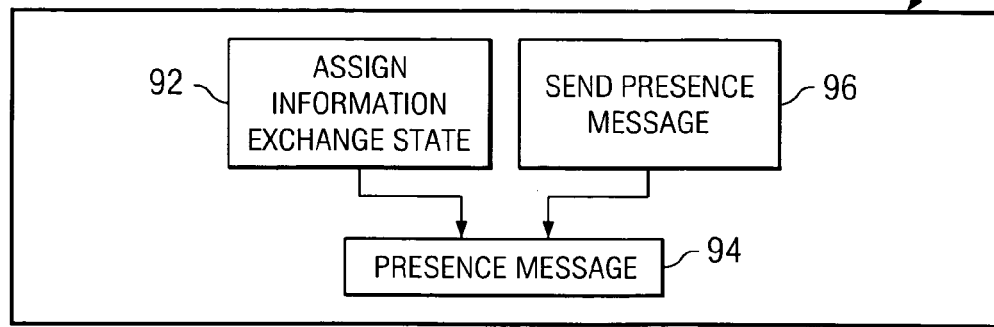
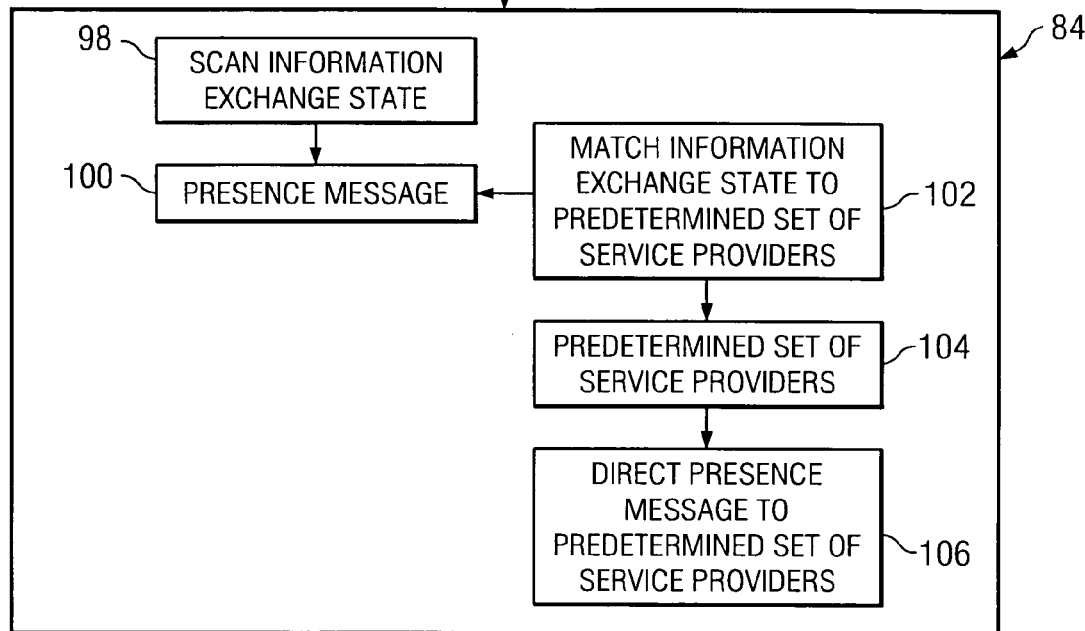
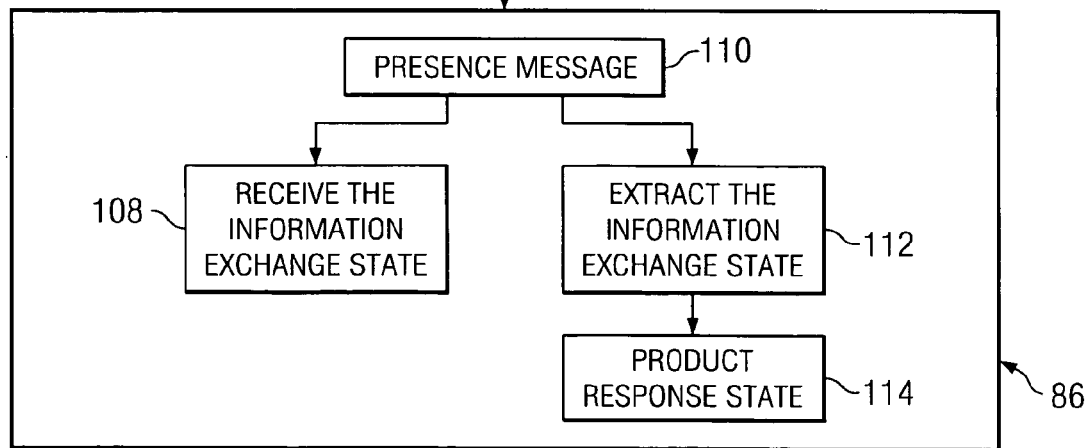
FIG. 7

SERVICE CREATION VIA PRESENCE MESSAGING

BACKGROUND OF THE INVENTION

Field of the Invention

Presence is generally defined as knowing that a person is available via, for example, a certain device over a particular medium as soon as the user connects to the network. For instance, via presence information, it may be ascertained that the person is available online, and on a connected device with a certain device profile. Currently presence is only used to communicate the state information of a person or an entity. A user which indicates its presence on the network is termed presentity. Presence is used to notify a group of watchers in a contact list about the state of person, including availability. When the user changes its presence state, each contact on the contact list is informed about the new presence state of the user.

Previously the burden of knowing how to communicate with a person rested on the individual initiating contact and sending the message, but presence information makes that decision on behalf of the message receiver. The present invention is generally related to presence messaging to trigger a network, system, application or service provider to take an action and, more specifically to enable service creation via presence messaging.

The present invention utilizes presence to enable services. In this case, presence infrastructure is used to carry the messaging similar to Instant Messaging (IM) or Short Message Service (SMS) only to a specific entity, and is not delivered to all other entities which are watchers of the same presentity but only those which are matched to an information exchange state of the presence message.

Therefore, what is needed is a method of using presence messaging to enable service creation. More specifically, assigning an information exchange state associated with a presence message and directing the presence message to at least one service provider from a predetermined set of service providers.

SUMMARY OF THE INVENTION

The information exchange state of presence message of the present invention enables directing the presence message to a targeted watcher to take appropriate actions based upon the information exchange state of the presence message.

The targeted watcher in the present invention is at least one of a set of service providers. The set of service providers is pre-determined according to criteria set in the information exchange state.

The present invention can be used for information collection based on the presence messaging. For example, if the user is registered to a service called "home repair service". The information exchange state of the user's home devices could be delivered to the predetermined set of service providers. If the information exchange state indicates that a refrigerator filter failed, quotes are requested from at least one of the predetermined set of service providers about availability and cost of replacing the filter. This quote information is then automatically fed to the home owner. In this case, the information exchange state is only delivered to the predetermined set of service providers, which are enabled to collect specific information for repairs.

The present invention provides for automatic actions based on the information exchange state of the presence message. For example, if a network router sends an information exchange state of the presence message such as a delivery of service attack on specific port, the network monitor system would be enabled to shut down the specific port automatically, and alerts the network manager.

The present invention provides for user communication. If user A sets the information exchange state of the presence state to inform a specific user B that they will be called at a specific time, then the information exchange state of the presence message is only delivered to User B. The other contacts do not receive the information exchange state of the presence state. At the specified time, the system automatically establishes the call between user A and B.

In one embodiment of the invention a method for service creation via presence messaging, comprising assigning an information exchange state associated with a presence message and directing the presence message to at least one of a service provider from a predetermined set of service providers.

In another embodiment of the invention a method for service creation via presence messaging, comprising, assigning an information exchange state associated with a presence message, wherein the information exchange state contains a query, enabling an actionable response determined by the presence message, sensing a change in the presence message state, scanning the information exchange state of the presence message, matching the information exchange state to at least one of a service provider of a predetermined set of service providers, directing the presence message to the at least one service provider of the predetermined set of service providers, enabling an actionable response determined by the presence message, extracting the information exchange state by the at least one service provider of the predetermined set of service providers, and producing a response state associated with the information exchange state of the presence message.

In a further embodiment of the invention a computer readable medium comprising instructions for assigning an information exchange state associated with a presence message, receiving the presence message in a presence infrastructure, scanning an information exchange state of a presence message, matching the information exchange state to at least one of a service provider of a predetermined set of service providers, directing the presence message to the at least one of the service provider of the predetermined set of service providers, sensing a change in the presence message state, receiving an information exchange state of a presence message, extracting the information exchange state, and producing a response state associated with the information exchange state of the presence message.

In yet a further embodiment of the invention a system for service creation via presence messaging, comprising, a memory in which is received a presence message having an information exchange state, a first processor communicably coupled to the memory, the first processor adapted to, assign the information exchange state associated with the presence message, and send the presence message to the memory, a second processor communicably coupled to the memory, the second processor adapted to, scan the information exchange state of the presence message, match the information exchange state to at least one of a service provider of a predetermined set of service providers, direct the presence message to the at least one service provider of the predetermined set of service providers, wherein the second processor enables a response from the at least one service provider from the predetermined set of service providers, a third processor communicably coupled to the memory, the third processor adapted to, receive the information exchange state of the presence message, extract the information exchange state, and produce a response state associated with the information exchange state of the presence message.

BRIEF DESCRIPTION OF THE DRAWINGS

FIG. 1 depicts a first flow chart of service creation via presence messaging in accordance with a preferred embodiment of the present invention;

FIG. 2 depicts a second flow chart of service creation via presence messaging in accordance with a preferred embodiment of the present invention;

FIG. 3 depicts a first software flow block of service creation via presence messaging in accordance with a preferred embodiment of the present invention;

FIG. 4 depicts a second software flow block of service creation via presence messaging in accordance with a preferred embodiment of the present invention;

FIG. 5 depicts a third software flow block of service creation via presence messaging in accordance with a preferred embodiment of the present invention;

FIG. 6 depicts a system of service creation via presence messaging in accordance with a preferred embodiment of the present invention; and FIG. 7 depicts a detailed system of service creation via presence messaging in accordance with a preferred embodiment of the present invention.

DETAILED DESCRIPTION OF THE INVENTION

Referring now to FIG. 1, a first flow chart of a method of service creation via presence messaging 10 is shown. Presence is the technology by which a user, called a presentity, makes his or her state known to another individual, called a watcher. Currently, the most common use for presence is to assist in the establishment of communication sessions. A network in which presence is established is called a presence infrastructure and typically resides on a presence server. In the present invention an information exchange state is assigned 12 to a presence message. The information exchange state can contain an action request and information pertinent to the action request. A set of service providers is associated with the information exchange state to form a predetermined set (list) of service providers capable of acting upon the information exchange state. The presence message is directed 14 to at least one service provider of the predetermined set of service providers. These blocks or modules are software, hardware, firmware, and/or the combination of software, hardware, and/or firmware. The transfer of information between the assignment of the information exchange state of the presence message and its direction to at least one service provider of the predetermined set of service providers occurs via at least one of a wireless protocol, a wired protocol and the combination of the wireless protocol and the wired protocol.

Referring now to FIG. 2, a second flow chart of the method of service creation via presence messaging 20 is shown. In the present invention the information exchange state is assigned 22 to the presence message. The change in the information exchange state of the presence message is sensed 24 by the presence infrastructure. The presence message information exchange state is scanned 26 by the presence infrastructure. The information exchange state is matched 28 to the set of service providers associated with the information exchange state to form the predetermined set of service providers capable of acting upon the information exchange state. The presence message is directed 30 to at least one service provider of the predetermined set of service providers. The information exchange state is extracted 32 from the presence message by the at least one service provider of the predetermined set of service providers. The at least one service provider of the predetermined set of service providers produces 34 a response state associated with the information exchange state. These blocks or modules are software, hardware, firmware, and/or the combination of software, hardware, and/or firmware. The transfer of information of the information exchange state of the presence message occurs via at least one of the wireless protocol, the wired protocol and the combination of the wireless protocol and the wired protocol.

Referring now to FIG. 3, a first software flow block of the method of service creation via presence messaging 40 is shown. In the present invention the information exchange state is assigned 42 to the presence message by the presentity. The presence message is received 44 by the presence infrastructure, having been sent to the presence infrastructure by the presentity. For example, the presence infrastructure may be accessed by a cellular phone or a computer with external wireless capability (such as the wireless card) or internal wireless capability (such as 802.11 or any of the other 802 variants), or by an Internet Protocol enabled phone. Other devices may also communicate with the presence infrastructure. These blocks or modules are software, hardware, firmware, and/or the combination of software, hardware, and/or firmware. The transfer of information of the information exchange state of the presence message occurs via at least one of the wireless protocol, the wired protocol and the combination of the wireless protocol and the wired protocol.

Referring now to FIG. 4, a second software flow block of the method of service creation via presence messaging 50 is shown. In the present invention the information exchange state of the presence message is scanned 52 by the presence infrastructure. The information exchange state is matched 54 to the predetermined set of service providers which would be able to take action based upon the specific information exchange state. The presence message is directed 56 to the at least one service provider of the set of predetermined set of service providers. These blocks or modules are software, hardware, firmware, and/or the combination of software, hardware, and/or firmware. The transfer of information of the information exchange state of the presence message occurs via at least one of the wireless protocol, the wired protocol and the combination of the wireless protocol and the wired protocol.

Referring now to FIG. 5, a third software flow block of the method of service creation via presence messaging 60 is shown. In the present invention the information exchange state of the presence message is received 62 by the predetermined set of service providers. The information exchange state is extracted 64 by the at least one service provider of the set of predetermined service providers. The at least one service provider of the set of predetermined service providers produces 66 the response state. The response state produced is then directed to the presence message which had the assigned information exchange state. These blocks or modules are software, hardware, firmware, and/or the combination of software, hardware, and/or firmware. The transfer of information of the information exchange state of the presence message occurs via at least one of the wireless protocol, the wired protocol and the combination of the wireless protocol and the wired protocol.

The present invention includes a unique computer readable medium or software that is preferably stored on the presence server. In other embodiments, the software of the present invention can be stored on the presentity, the watcher or a combination of at least two of the presence server, the presentity, and the watcher. Such a computer readable medium comprises instructions for performing the functionality described in relation to FIGS. 1-5 and for assigning the information exchange state to the presence message and directing the presence message to the at least one service provider of the predetermined set of service providers.

Referring now to FIG. 6, a system of service creation via presence messaging 70 is shown. In the present invention a first processor 72 (presentity) transfers the presence message having the information exchange state to a second processor (presence infrastructure). A third processor 78 (the at least one service provider of the set of predetermined service providers) receives the presence message having the actionable information exchange state from the presence infrastructure. The first processor (presentity) and the third processor (the at least one service provider of the set of predetermined service providers) are communicably coupled to the third processor (presence infrastructure). For example, the presence infrastructure may be accessed by the cellular phone or the computer with external wireless capability (such as the wireless card) or internal wireless capability (such as 802.11 or any of the other 802 variants), or by the Internet Protocol enabled phone. Other devices may also communicate with the presence infrastructure. These modules are software, hardware, firmware, and/or the combination of software, hardware, and/or firmware. The communications coupling occurs via at least one of the wireless protocol, the wired protocol and the combination of the wireless protocol and the wired protocol.

Referring now to FIG. 7, a detailed system of service creation via presence messaging 80 is shown in greater detail. In the present invention the first processor 82 (presentity) is communicably coupled 88 to the second processor 84 which is the presence server providing presence infrastructure. The third processor 86 (the at least one service provider of the set of predetermined service providers) is communicably coupled 90 to the second processor 84. The information exchange state is assigned 92 to the presence message 94 by the first processor 82 (presentity). The presence message is sent 96 to the presence infrastructure by the first processor (presentity). The information exchange state of the presence message is scanned 98 by the second processor 84 (presence server). The information exchange state of the presence message is stored in a memory 100 and is matched 102 to the predetermined set of service providers 104 which would be able to take action based upon the specific information exchange state. The presence message is directed 106 to the second processor (the at least one service provider of the set of predetermined set of service providers).

The information exchange state of the presence message is received 108 by the third processor 86 (the at least one service provider of the predetermined set of service providers). The information exchange state is extracted 112 by the third processor (the at least one service provider of the set of predetermined service providers or watcher). The at least one of the set of predetermined service providers produces 114 the response state. The response state produced is then directed to the presence message which had the assigned information exchange state. These modules are software, hardware, firmware, and/or the combination of software, hardware, and/or firmware. The communications coupling occurs via at least one of the wireless protocol, the wired protocol and the combination of the wireless protocol and the wired protocol.

Although the exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the first, second or third processors. Also, these capabilities may be performed in the current manner or in the distributed manner and on, or via, any device able to direct presence messages to targeted watchers. Further, although depicted in the particular manner, various blocks may be repositioned without departing from the scope of the current invention. For example, the first second and third processors could be united into one processor. Still further, although depicted in the particular manner, the greater or lesser number of users, watchers and presence infrastructures could be utilized.

Further, the lesser or greater number of information exchange states may be utilized with the present invention and such presence messages may include complementary information in order to accomplish the present invention, to provide additional features to the present invention, and/or to make the present invention more efficient.

What is claimed is:

1. A method for service creation via presence messaging, comprising:
   assigning an information exchange state to a presence message used to identify a presence of a network device wherein the information exchange state contains an action request query;
   scanning the information exchange state and matching the information exchange state to a predetermined set of service providers to form a set of service providers capable of acting upon the information exchange state;
   directing the presence message to at least one service provider from the predetermined set of service providers, wherein the at least one service provider is capable of acting upon the information exchange state;
   enabling an automatic response from the at least one service provider, the automatic response based on the action request query contained in the information exchange state;
   and sensing a change in the state of the presence message.

2. The method of claim 1 comprising enabling a response from the at least one service provider.

3. The method of claim 1 comprising enabling a quotation response from the at least one service provider.

4. The method of claim 1 comprising enabling an actionable response determined by the presence message.

5. The method of claim 1 comprising producing a response state associated with the information exchange state of the presence message.

6. The method of claim 1 comprising extracting the information exchange state by the at least one of the service providers.

7. A method for service creation via presence messaging, comprising: assigning an information exchange state to a presence message used to identify a presence of a network device, wherein the information exchange state contains a query; enabling an actionable response determined by the presence message; sensing a change in the presence message; scanning the information exchange state of the presence message; matching the information exchange state to a predetermined set of service providers to form a set of service providers capable of acting upon the information exchange state; directing the presence message to at least one service provider of the predetermined set of service providers, wherein the at least one service provider is capable of acting upon the information exchange state; and enabling an automatic response from the at least one service provider, the automatic response based on the query contained in the information exchange state.

8. The method of claim 7 comprising:
enabling an actionable response determined by the presence message;
extracting the information exchange state by the at least one service provider of the predetermined set of service providers; and
producing a response state associated with the information exchange state of the presence message.

9. A non-transitory computer readable storage medium comprising instructions that when executed cause a processor to perform: assigning an information exchange state to a presence message used to identify a presence of a network device, wherein the information exchange state contains an action request; scanning the information exchange state and matching the information exchange state to a predetermined set of service providers to form a set of service providers capable of acting upon the information exchange state; receiving the presence message in a presence infrastructure; directing the presence message to at least one service provider from the predetermined set of service providers, wherein the at least one service provider is capable of acting upon the information exchange state; enabling an automatic response from at least one service provider, the automatic response based on the action request query contained in the information exchange state.

10. The non-transitory computer readable storage medium of claim 9 further comprising instructions that cause the processor to perform: sensing a change in the presence message state.

11. The non-transitory computer readable storage medium of claim 9 further comprising instructions that when executed cause the processor to perform: producing a response state associated with the information exchange state of the presence message.

12. A system for service creation via presence messaging, comprising: a memory configured to receive a presence message having an information exchange state, wherein the information exchange state contains an action request query; and a processor communicably coupled to the memory, the processor adapted to: assign the information exchange state to the presence message used to identify a presence of a network device, wherein the information exchange state contains an action request query; send the presence message to the memory; scan the information exchange state and match the information exchange state to a predetermined set of service providers to form a set of service providers capable of acting upon the information exchange state; direct the presence message to at least one service provider from the predetermined set of service providers, wherein the at least one service provider is capable of acting upon the information exchange state; enabling an automatic response from the at least one service provider, the automatic response based on the action request query contained in the information exchange state; and sense a change in the state of the presence message.

* * * * *